United States Patent
Heinzle et al.

(10) Patent No.: US 11,505,215 B2
(45) Date of Patent: Nov. 22, 2022

(54) CABLE-DRAWN CONVEYING DEVICE AND METHOD FOR OPERATING SUCH A DEVICE

(71) Applicant: Innova Patent GmbH, Wolfurt (AT)

(72) Inventors: Florian Heinzle, Götzis (AT); Christof Kohler, Dornbirn (AT)

(73) Assignee: Innova Patent GmbH, Wolfurt (AT)

( * ) Notice: Subject to any disclaimer, the term of this patent is extended or adjusted under 35 U.S.C. 154(b) by 347 days.

(21) Appl. No.: 16/618,629

(22) PCT Filed: May 30, 2018

(86) PCT No.: PCT/EP2018/064194
§ 371 (c)(1),
(2) Date: Dec. 2, 2019

(87) PCT Pub. No.: WO2018/220016
PCT Pub. Date: Dec. 6, 2018

(65) Prior Publication Data
US 2020/0189621 A1 Jun. 18, 2020

(30) Foreign Application Priority Data
Jun. 2, 2017 (AT) .............................. A 50464/2017

(51) Int. Cl.
*B61B 9/00* (2006.01)
*B61C 3/00* (2006.01)
(Continued)

(52) U.S. Cl.
CPC ............... *B61B 9/00* (2013.01); *B61C 3/00* (2013.01); *B60L 2200/26* (2013.01);
(Continued)

(58) Field of Classification Search
CPC ......... B61B 9/00; B61B 12/022; B61B 12/10; B61C 3/00; B60L 2200/26; B61L 23/002
See application file for complete search history.

(56) References Cited

U.S. PATENT DOCUMENTS

2015/0276826 A1    10/2015    Roosli et al.

FOREIGN PATENT DOCUMENTS

| CH | 701450 A1 | 1/2011 |
|----|-----------|--------|
| CN | 1605517 A | 4/2005 |

(Continued)

OTHER PUBLICATIONS

Japanese Office Action; Application No. 2019-566314; dated Nov. 24, 2020; 5 Pages.

(Continued)

*Primary Examiner* — Robert J McCarry, Jr.
(74) *Attorney, Agent, or Firm* — Whitmyer IP Group LLC

(57) ABSTRACT

A system and method to ensure a sufficient amount of electrical energy is supplied to a cable-drawn vehicle of a transportation device. Electrical loads of the vehicle are supplied with power outside a station by an electrical energy store of the vehicle or by both an electrical energy store and the generator during a first movement phase, in which the vehicle is accelerated to a limit speed or, conversely, decelerated from a limit speed into a station. In a subsequent second movement phase, the vehicle is supplied with electrical energy by the generator while the vehicle moves at a speed that is greater than the limit speed.

14 Claims, 3 Drawing Sheets

(51) Int. Cl.
  *B61B 12/02* (2006.01)
  *B61B 12/10* (2006.01)
  *B61L 23/00* (2006.01)

(52) U.S. Cl.
  CPC ............ *B61B 12/022* (2013.01); *B61B 12/10* (2013.01); *B61L 23/002* (2013.01)

(56) References Cited

FOREIGN PATENT DOCUMENTS

| CN | 201002629 Y | 1/2008 | |
|----|----|----|----|
| CN | 101435409 A | 5/2009 | |
| CN | 102211529 A | 10/2011 | |
| CN | 102673558 A | 9/2012 | |
| CN | 103129565 A | 6/2013 | |
| CN | 203005424 U | 6/2013 | |
| CN | 103507650 A | 1/2014 | |
| CN | 103991388 A | 8/2014 | |
| CN | 105774833 A | 7/2016 | |
| CN | 106253467 A | 12/2016 | |
| EP | 1992539 A1 | 11/2008 | |
| EP | 1992539 B1 * | 2/2011 | ........... B61B 12/002 |
| EP | 2623389 A1 | 8/2013 | |
| JP | 07002092 A | 1/1995 | |
| JP | 2005029160 A | 2/2005 | |
| JP | 2005297635 A | 10/2005 | |
| JP | 2008189130 A | 8/2008 | |
| WO | 2011003812 A2 | 1/2011 | |
| WO | 2015196221 A1 | 12/2015 | |
| WO | 2016145463 A1 | 9/2016 | |

OTHER PUBLICATIONS

Chinese Office Action with Translation; Application No. 201880036649.5; dated Aug. 3, 2020; 16 Pages.
Austrian Office Action Application No. 2A A 50464/2017 Completed: Apr. 16, 2018; dated Apr. 27, 2018 3 Pages.
International Preliminary Report on Patentability Application No. PCT/EP2018/064194 Completed: Aug. 2, 2019 13 Pages.
International Search Report and Written Opinion of the International Searching Authority Application No. PCT/EP2018/064194 Completed: Aug. 7, 2018; dated Aug. 20, 2018 11 Pages.
Translation of International Search Report Application No. PCT/EP2018/064194 Completed: Aug. 7, 2018; dated Aug. 20, 2018 2 Pages.

* cited by examiner

CABLE-DRAWN CONVEYING DEVICE AND METHOD FOR OPERATING SUCH A DEVICE

TECHNICAL FIELD

The present teaching relates to a transportation device comprising at least one vehicle, which is coupled to a driven cable of the transportation device, for transporting the vehicle between a first station and a second station, whereby at least one generator being provided on the vehicle, which generates electrical energy while the vehicle is moving in order to supply power to electrical loads of the vehicle. Furthermore, the present teaching relates to a method for operating such a transportation device.

BACKGROUND

Transportation devices for transporting passengers or objects are known, in which a vehicle of the transportation device does not have its own drive. In this case, the vehicle is driven by an external stationary drive. These are often designed as cable-drawn transportation devices, in which the vehicle is permanently clamped or coupled to a circulating cable and is moved together with the cable. Examples of such transportation devices are funiculars, aerial tramways (aerial cableways) or cable railways (often also referred to as People Movers or Cable Liners). Such systems can comprise one or more tracks and one or more vehicles can be moved at the same time (also on a single route). The vehicles are moved between two stations in either circulation movement or reversible movement.

A number of electrical loads are arranged on vehicles of modern transportation devices, in particular in devices for transporting passengers. A vehicle must therefore comprise an electrical energy supply in order to supply electrical energy to the electrical loads. In the stations in which the vehicles are generally at a standstill or only move very slowly, the electrical energy can be externally supplied very easily, for example by means of busbars or overhead wires, by means of closed electrical contacts, but also wirelessly, for example inductively. Such transportation devices are, however, stretch for long distances, and therefore it is often difficult in practice to ensure that the vehicles are supplied with energy over this distance.

Efficient electrical energy stores on the vehicle are conceivable for this purpose. However, these would have to be adequately dimensioned, which leads to large, heavy energy stores. Likewise, it is difficult to charge such energy stores in the stations, since this would require very high electrical currents and power.

In order to supply energy to a vehicle of a transportation device of this type, busbars or overhead wires are therefore often also provided along the entire travel distance of the vehicle. The vehicle is in contact with the busbar or overhead wire by means of a suitable current collector via which it receives the necessary electrical energy. Energy stores could therefore be completely omitted from the vehicle, or only small energy stores would have to be provided for supplying the vehicle with emergency power if faults occur. Such busbars or overhead wires are, however, complex to install and also require regular maintenance due to the high degree of wear between the busbars or overhead wires and the current collector. Having said that, in busbars or overhead wires there is also always the risk of the current collector derailing and of electric shocks or ground faults, and therefore such designs are also susceptible to faults and place high demands on the operational safety.

It is also known to arrange a generator on a vehicle of such transportation devices, which generator is operatively connected to a wheel of the vehicle in order to generate electric current by means of the movement of the wheel. Examples of this can be found in EP 1 992 539 B1 or EP 2 623 389 B1. Although this increases the effort for the vehicle, said vehicle can therefore generate the electrical energy required for its electrical loads itself. In this case, an electrical energy store for supplying the electrical loads with power can be omitted from the vehicle, or only a small energy store needs to be provided in order to supply the vehicle with power in an emergency. This solution is particularly suitable for transportation devices in which the vehicle is continuously moved over long travel distances, i.e. for example as in an aerial cableway or funicular, which allows for a continuous supply of electrical energy. If the vehicle stops frequently or in the event of shorter travel distances, as is often the case in funiculars, this solution is, however, not necessarily suitable since the generator on the vehicle can, of course, only generate electrical energy when the vehicle is moving.

SUMMARY

One object of the present teaching is therefore to provide a transportation device and a method for operating a transportation device, which always ensures that a sufficient amount of electrical energy is supplied to a vehicle of the transportation device by means of simple technical means.

This object is achieved for the method by the electrical loads of the vehicle being supplied with power outside the first station by an electrical energy store of the vehicle or by both an electrical energy store and the generator during a first movement phase, in which the vehicle is accelerated to a limit speed out of the station, or, conversely, is decelerated from a limit speed into the station, and, in a subsequent second movement phase when said vehicle moves at a speed that is greater than the limit speed, the vehicle is supplied with electrical energy by the generator. The transportation device is characterized in that an electrical energy store is provided on the vehicle and the electrical energy store or the electrical energy store together with the generator supplies the electrical loads of the vehicle with electrical energy when the vehicle is accelerated to a limit speed out of the station or, conversely, is decelerated from a limit speed into a station, and the generator supplies electrical energy to the electrical loads of the vehicle when said vehicle moves at a speed that is greater than the limit speed.

Busbars or overhead wires, which used to be customary and are susceptible to faults, for supplying energy to a vehicle of the transportation device outside of the stations can therefore be omitted. However, it is equally not necessary to provide large electrical energy stores to ensure energy supply between the stations. The generator on the vehicle is used for this. An electrical energy store is provided on the vehicle in order to close the supply gaps that exist with a generator, by means of which the loads are supplied with electrical energy until the generator can take over by itself. This energy store can therefore be designed smaller, since it is not required during the entire time the vehicle is moving.

A generator that can be used in both directions is preferably used, since the transportation device can therefore be operated in reversible movement.

If the electrical energy store on the vehicle is charged in the first station by a charging device that is supplied with electricity by the station, the generator can be designed smaller, since it does not have to take over charging the energy store, or at least only has to take over charging said store to a lesser extent. Due to the innately smaller energy store, less power is therefore also required for charging the electrical energy store, which also simplifies the charging device in the station.

In order to be able to use excess electrical energy from the generator, the electrical energy store on the vehicle is advantageously charged by the generator during the second movement phase.

The strain on the energy store can be reduced if at least one electrical load of the vehicle is switched off, either fully or in part, whilst the vehicle makes a stop in a station and/or during the first movement phase.

If at least one electrical load of the vehicle is only supplied with electrical energy by means of the generator, in particular loads, the brief cut-out of which can be tolerated, and preferably loads having a very high energy requirement, can only be supplied with power by means of the generator in order to reduce the strain placed on the energy store.

If at least two vehicles, which are coupled to one another, are moved, at least one load of one of the two vehicles is advantageously supplied with electrical energy by the other vehicle if the energy supply to one vehicle cuts out. This can maintain the operation of the transportation device, at least to a limited extent, if a fault occurs on the vehicle, in particular in the energy store or the generator.

BRIEF DESCRIPTION OF THE DRAWINGS

The present teaching will be explained in more detail in the following with reference to FIGS. 1 to 4, which schematically and non-restrictively show advantageous embodiments of the present teaching by way of example, in which.

DETAILED DESCRIPTION

Figure 1:
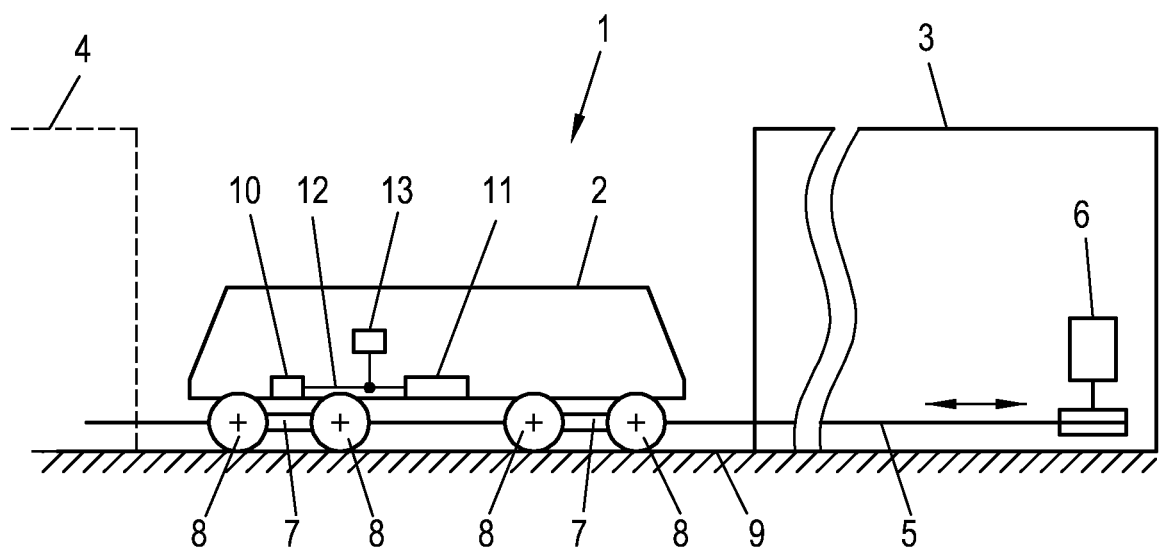
FIG. 1 shows a transportation device according to the present teaching.

FIG. 1 is a schematic view of a cable-drawn transportation device 1 in the form of a cable railway for transporting passengers. The transportation device 1 comprises at least one vehicle 2, which is moved back and forth between a first station 3 and a second station 4 (only indicated in FIG. 1). For this purpose, the vehicle 2 is coupled to a driven cable 5 (either permanently clamped or releasably coupled) and the cable 5 is driven by means of a cable drive 6, for example an electric motor, in order to move the vehicle 2. For example, the cable circulates between the first station 3 and the second station 4 and the direction of movement of the vehicle 2 is determined by the direction of circulation of the cable 5. A plurality of wheels 8 are arranged on the vehicle 2, which roll on a stationary route 9. The wheels 8 are preferably arranged on at least one undercarriage 7 of the vehicle 2. Such transportation devices 1 are well known, and will therefore not be discussed in more detail here.

In order to supply the vehicle 2 with electrical energy, at least one electrical generator 10 is provided on the vehicle 2, which generates the electrical energy required for the electrical loads 11 of the vehicle 2 while the vehicle 2 is moving. Typical electrical loads 11 are control devices for doors, safety and monitoring devices, radio, entertainment systems (screens), air conditioning systems, heating systems, lighting systems, fans, etc. A vehicle 2 therefore requires a relatively high electrical current, typically from an on-board electrical system 12, generally 12 V or 24 V direct voltage.

The generator 10 generates electrical energy from a relative movement between the vehicle 2 and the route 9. Different designs are, of course, possible for this, but this is irrelevant for the present teaching. For example, a wheel hub generator could be provided on at least one wheel 8. Likewise, a friction wheel could be provided on the vehicle 2, which rolls either on a wheel 8 or on the route 9 and which drives the generator 10. Any type of transmission can of course also be provided between the friction wheel and the generator 10, for example a positive or non-positive or hydraulic transmission, in order to indirectly drive the generator 10 by means of the friction wheel. Of course, a plurality of generators 10 can also be provided on the vehicle in order to minimize the size on the one hand and to be able to provide the necessary electrical energy on the other hand. A plurality of generators 10 can, however, also be used for redundancy purposes in order to ensure that power is supplied by means of a different generator 10 if one generator 10 fails.

Particularly advantageously, a generator 10 provided which can be driven in both directions which allows for operating the transportation device 1 with reversible movement, whereby the vehicle 2 is moved on the same route 9 back and forth between the stations 3, 4.

A generator 10 only generates a sufficient amount of electrical energy above a specific speed of the vehicle 2 in order to supply the loads 11 with power. This limit speed is particularly dependent on the type of generator 10 and on the design of the drive of the generator 10, but can be assumed as being known.

At least one electrical energy store 13 is also arranged on the vehicle, which is also connected to the on-board electrical system 12. The electrical energy store 13 is designed such that the electrical loads 11 can be substantially supplied with electrical energy by means of said energy store. The electrical energy store 13 therefore guarantees a supply of electricity, which goes beyond the supply of power to the vehicle 2 that is purely for emergencies, in which only the essential electrical loads 11 are supplied with power. In the event of a supply of emergency power, only safety-relevant electrical loads 11, such as communication, safety, control and monitoring devices, are generally supplied with power, while other loads 11, such as heaters, fans, air conditioning, light, entertainment, etc. are switched off. However, the electrical energy store 13 is intended to be able to provide electrical energy in particular also to such loads 11, too. However, certain loads 11', in particular those whose brief cut-off can be tolerated, preferably loads having a particularly high energy consumption such as an air conditioning system or an electrical heater, could generally also not be supplied with power by the electrical energy store 13, but only by the generator 10.

Figure 2:
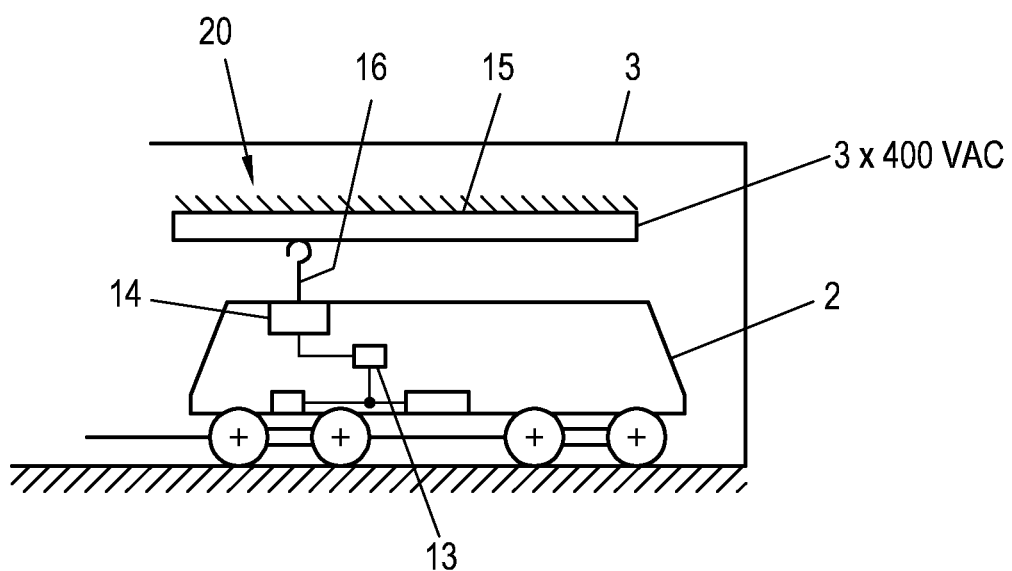
FIG. 2 shows a vehicle of the transportation device in a station that comprises a charging device.

A charging device 20 can also be provided in at least one station 3, 4, which is used to charge the electrical energy store 13 of the vehicle 2, as is explained on the basis of FIG. 2. The charging device 20 is connected to the electrical energy store 13 in the station 3 in order to charge it. For this purpose, the charging device 20 can of course have different designs. In the simplest case, the electrical energy store 13 is directly connected to a suitable charging voltage by means of an electrical contact. However, contactless energy transfer, for example inductive energy transfer, could also be provided between the station 3 and the vehicle 2 for charging purposes. However, since the vehicle 2 generally only makes a stop in the station for a short amount of time, the time available for charging the electrical energy store 13 is also limited. Very high power densities are therefore often required to charge said energy store, and therefore an powerful charging device 20, for example as shown in FIG. 2, is advantageous.

In the embodiment shown in FIG. 2, a stationary conductor 15, for example a busbar or an overhead wire, including a stationary polyphase conductor, is provided in the station 3 in which said energy store is intended to be charged, which conductor is connected to an external power supply, for example 3×400 V or 3×690 V alternating voltage. A current collector 16 is provided on the vehicle 2, which makes contact with the stationary conductor 15 when the vehicle 2 enters the station 3. For charging, the voltage of the stationary conductor 15 is connected to the electrical energy store 13 by means of a charger 14 of the charging device 20, for example in the form of a rectifier for rectifying the supply current to the battery voltage.

If the generator 10 can provide enough power, the charging device 20 in the station 3 could also be omitted. In this case, the electrical energy store 13 could be charged by means of the generator 10, which can then only happen when the vehicle 2 is moving. For this purpose, the electrical energy store 13 of course needs to be adequately dimensioned, since the loads 11 of the vehicle 2 would then likewise have to be supplied with power in the station 3 by means of the electrical energy store 13. A stationary conductor 15 in the station 3 and the external current supply thereto could therefore be omitted.

Figure 3:
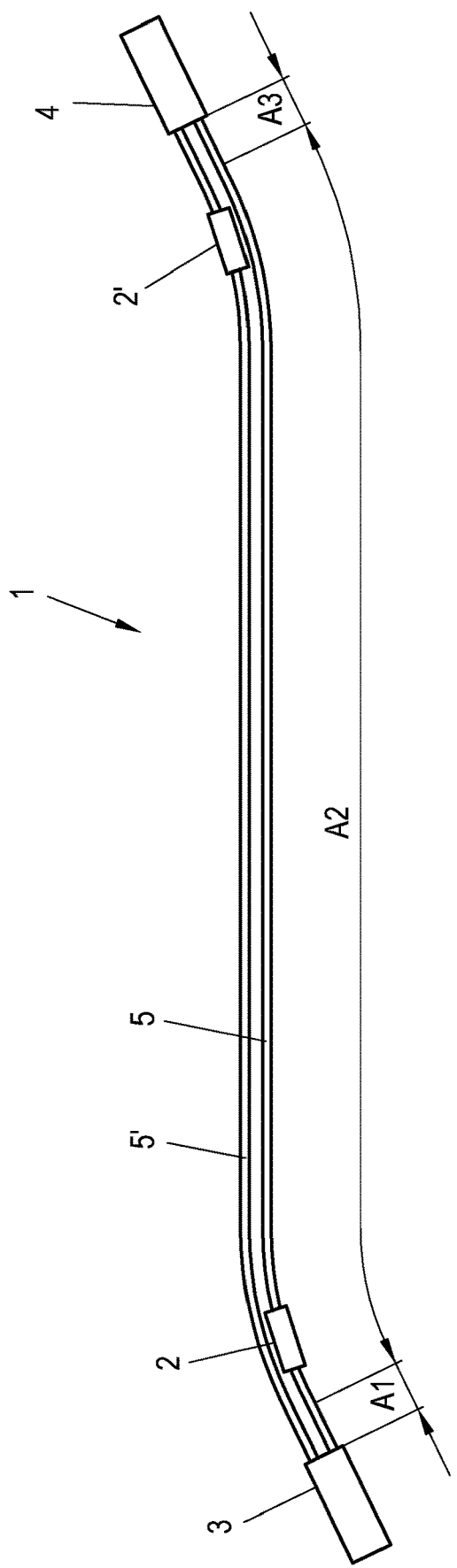
FIG. 3 shows the mode of operation of the transportation device.

The operation of the transportation device 1 will now be explained with reference to FIG. 3. The shown transportation device 1 is a two-track cable-pulled transportation device 1, whereas a vehicle 2, 2' such as that described being moved on each track by an associated cable 5, 5'. The vehicles 2, 2' travel with reversible movement in opposite directions, for example, which is possible by means of a generator 10 that can be operated in both directions. The operation will only be explained in the following with reference to the vehicle 2, without any loss of generality.

In a first station 3, the electrical loads 11 of the vehicle 2 are supplied with power by the electrical energy store 13. The electrical energy store 13 in the station 3 is optionally charged by means of a charging device 20, for example by connecting the electrical energy store 13 in the station 3 to a stationary conductor 15. To this end, the vehicle 2 is preferably at a standstill in the station 3, for example in order to allow passengers to get on or off. The vehicle 2 can, however, also be moved through the station 3 at a very low speed so it is still possible to get on or off. When the vehicle 2 leaves the station 3, the vehicle 2 must be accelerated to a desired transport speed. A route segment A1 is therefore provided after the station 3, along which the vehicle 2 is accelerated but the electrical energy store 13 of the vehicle 2 (if provided) is no longer charged. During this first movement phase, the vehicle 2 cannot be supplied with power by the electrical generator 10 alone, since the relative speed required between the vehicle 2 and the route 9, and therefore also the rotational speed of the generator 10, is still too low. Only above a specific limit speed does the generator 10 generate the necessary electrical energy for supplying the electrical loads 11 of the vehicle 2 with power by itself. This limit speed does, however, of course not have be the transport speed at which the vehicle 2 is moved between the stations 3, 4. The loads 11 can therefore be supplied with power along the route segment A1 by both the electrical energy store 13 and the generator 10, whereby the proportion that is supplied by the generator 10 continuously increases from 0 to 100% as the vehicle accelerates. However, the supply of energy can also be switched from the electrical energy store 13 to the generator 10 as soon as the generator 10 can supply the necessary energy. In the second movement phase, which follows the first movement phase, the vehicle 2 travels the route segment A2 and the vehicle 2 is supplied with electrical energy by the at least one generator 10 on the vehicle 2 alone.

In the first movement phase, specific loads 11 could also only be switched on once the participation of the generator 10 is great enough to limit the strain placed on the electrical energy store 13, or could be switched on in a stepwise manner. As a result, loads 11 having a high energy requirement, can, for example, only be switched on towards the end of the first movement phase, while others are immediately supplied with electrical energy.

When approaching the next station 4, the vehicle 2 is decelerated such that electricity can no longer be supplied by the generator 10 alone at a certain speed. In this route segment A3 before the station 4, in a third movement phase that substantially corresponds to the first movement phase, the loads 11 are therefore supplied with electricity once again by means of both the electrical energy store 13 and the generator 10 or only by means of the electrical energy store 13, until the vehicle 2 has entered the station 4. Substantially the same as that already mentioned above for the first movement phase applies to the third movement phase. The electrical energy store 13 could also be charged in the station 4, as described.

Of course, more than two stations 3, 4 could also be provided in the transportation device 1, this, however, not changing the fundamental way of operating.

In addition, the vehicle 2 in the station 4, in particular if said station is an intermediate station, may not be stopped but is moved through the station 4 at a slow speed. In this case, the vehicle 2 could likewise be supplied with electricity by means of the electrical energy store 13. However, a stationary conductor 15 could also be provided, which extends out of the station 4 at the front and back of the station such that electricity is supplied in the region of the intermediate station by means of the stationary conductor 15. In this case, the electrical energy store 13 could, of course, also be charged.

Figure 4:
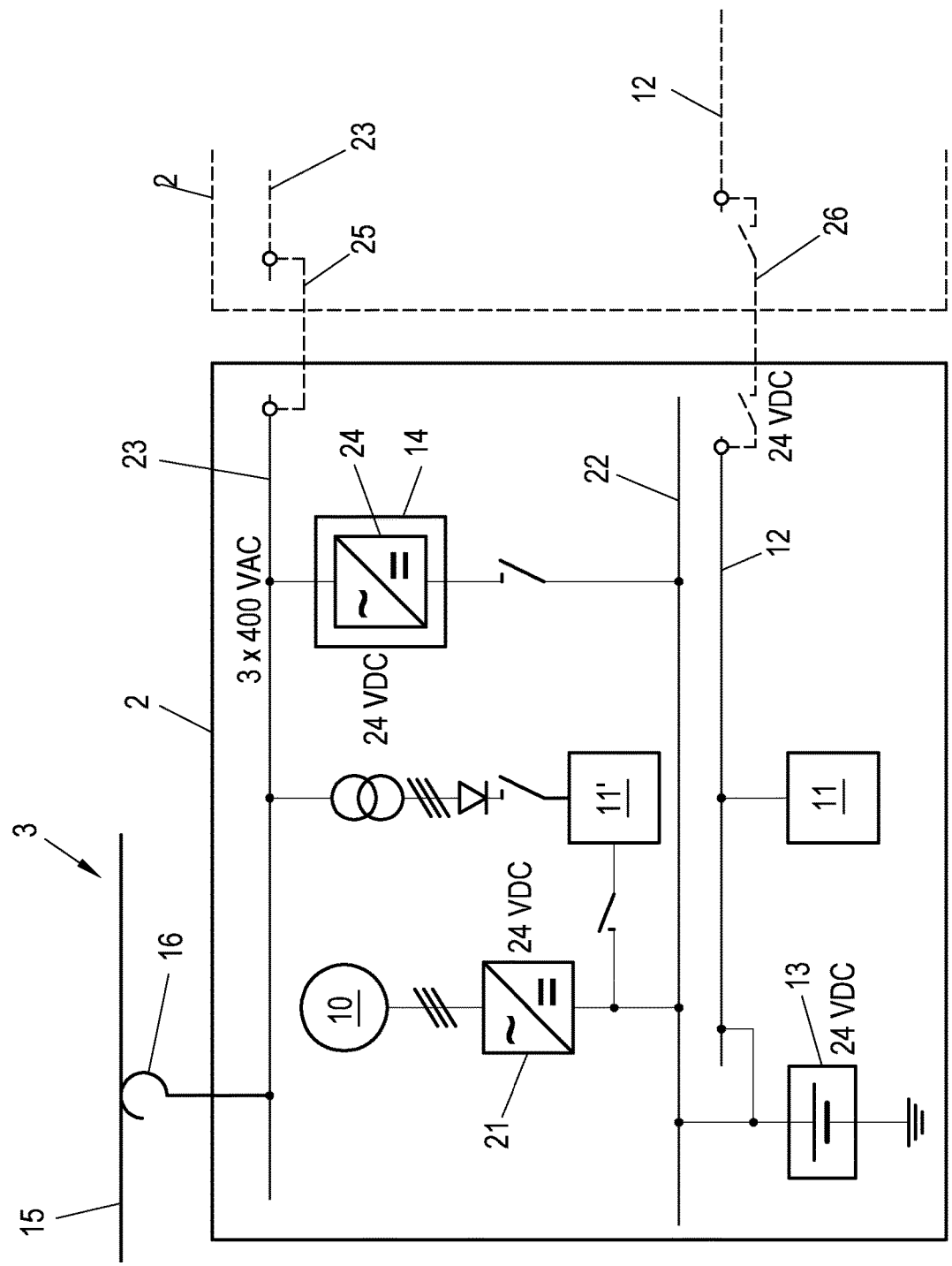
FIG. 4 shows an electrical circuit diagram of a vehicle of the transportation device.

An example of electrical wiring in the vehicle 2 is shown in FIG. 4. The electrical loads 11 of the vehicle 2 are connected to the on-board power system 12, in this case 24 VDC, for example. The electrical energy store 13 is also connected to the on-board power system 12. The on-board power system 12 is also connected to the electrical generator 10, for example by means of a voltage converter 21. During operation of the vehicle 2 along the route segment A2, the generator 10 generates electrical energy, which flows into the on-board power system 12 in order to supply the electrical loads 11 with power. Excess energy can be used to charge the electrical energy store 13. In the embodiment shown, an intermediate bus 22 is provided that is connected to the on-board power system 12. The generator 10 feeds into the intermediate bus 22. In this embodiment, energy is supplied in the route segment A1 by means of both the electrical energy store 13 and the generator 10, whereby both feed into the on-board power system 12. The lower the rotational speed of the generator 10, the lower the output voltage at the voltage converter 21 of the generator 10. If the output voltage at the voltage converter 21 of the generator 10 is smaller than the voltage of the electrical energy store 13, the electrical energy store 13 automatically takes over part of the task of supplying power to the loads 11.

A stationary conductor 15 is provided in the station 3, with which the vehicle 2 makes contact, for example by means of a current collector 16. An electricity supply network 23 is provided in the vehicle, which is supplied with power by the stationary conductor 15 by means of the current collector and which provides a supply voltage in the vehicle 2, for example 3×400 V. The conversion of the voltage at the stationary conductor 15 into the supply voltage in the vehicle 2, which may be necessary, is well-known and is not shown in FIG. 4. The on-board power system 12, which supplies power to the electrical loads 11 and charges the electrical energy store 13, is supplied with power from the electricity supply network 23 by means of a charger 14, a rectifier 24 in this case, via the intermediate bus 22 in this case.

Electrical loads 11' may also be provided that are not directly supplied with power by the electrical energy store 13, but either by the generator 10 or from the electricity supply network 23, depending on whether the vehicle 2 is in the station 3 or on the route segment A2. However, this is only possible for loads 11' that do not have any negative effects (in particular with regard to safety) when the energy supply cuts out briefly and that withstand many ON/OFF cycles. Such loads 11' would not be supplied with electrical energy on the route segment A1, which is, however, generally only very short. A typical load 11' that could be operated in this way would be an electrical heater, which, despite requiring a large amount of electrical energy, has no negative effects if the supply of energy thereto frequently briefly cuts out.

A train made up of several separate vehicles 2 that are coupled to one another could also be moved by means of the transportation device 1 (shown in FIG. 4). In this case, the electricity supply network 23 could be led through all the vehicles 2 of the train, for example by means of suitable electrical connections 25 between the vehicles (indicated in FIG. 4). A current collector 16 would only have to be provided on one vehicle 2. During normal operation, each vehicle 2 is supplied with electrical energy, as described above. If the on-board power system 12 of one vehicle 2 cuts out, for example due to a defective electrical energy store 13 or a defective generator 10, all the loads 11 of this vehicle 2 could fail. In order to prevent this, an electrical auxiliary power supply bus 26 (indicated in FIG. 4) can be provided between two vehicles 2 of the train, which bus connects the on-board power systems 12 of the two vehicles 2, for example by means of switches, in the event of a fault. As a result, at least the safety-relevant loads of the defective vehicle 2 can continue to be supplied with electrical energy by means of the other vehicle 2.

The invention claimed is:

1. A method for operating a cable-drawn transportation device, by which at least one vehicle that is coupled to a driven cable of the transportation device is moved between a first station and a second station, comprising:
    arranging at least one generator, which generates electrical energy while the vehicle is moving, on the vehicle in order to supply power to electrical loads of the vehicle,
    supplying the electrical loads of the vehicle with power outside a station by both an electrical energy store of the vehicle and the generator during a first movement phase, in which the vehicle is accelerated to a limit speed out of the station, or, conversely, is decelerated from a limit speed into the station, and
    in a subsequent second movement phase when the vehicle is moving at a speed that is greater than the limit speed, supplying the electrical loads of the vehicle with electrical energy by the generator.

2. The method according to claim 1, wherein the electrical energy store on the vehicle is charged in a station by a charging device that is supplied with electricity by the station.

3. The method according to claim 1, wherein the electrical energy store on the vehicle is charged by the generator during the second movement phase.

4. The method according to claim 1, wherein at least one electrical load of the vehicle is switched off, either fully or in part, whilst the vehicle makes a stop in a station and/or during the first movement phase.

5. The method according to claim 1, wherein in the subsequent second movement phase at least one electrical load of the vehicle is only supplied with electrical energy by the generator.

6. The method according to claim 1, wherein at least two vehicles, which are coupled to one another, are moved and at least one load of one of the two vehicles is supplied with electrical energy by the other vehicle if the energy supply to one vehicle cuts out.

7. The method according to claim 1, wherein, in the region of a third station that is arranged between the first station and the second station, the loads are supplied with electrical energy by the third station.

8. A transportation device, comprising:
    at least one vehicle, which is coupled to a driven cable of the transportation device, for transporting the vehicle between a first station and a second station,
    at least one generator provided on the vehicle, which generates electrical energy while the vehicle is moving in order to supply power to electrical loads of the vehicle,
    wherein an electrical energy store provided on the vehicle and the electrical energy store together with the generator supplies the electrical loads of the vehicle with electrical energy when the vehicle is accelerated to a limit speed out of a station or, conversely, is decelerated from a limit speed into a station, and
    the generator supplies electrical energy to the electrical loads of the vehicle while said vehicle moves at a speed that is greater than the limit speed.

9. The transportation device according to claim 8, wherein the at least one generator comprises a generator that can be operated in both directions.

10. The transportation device according to claim 8, wherein an on-board electrical system is provided in the vehicle which is connected to the electrical energy store and to the generator.

11. The transportation device according to claim 8, wherein a stationary conductor that is supplied with electricity is provided in one station, and a current collector that makes contact with the stationary conductor in the station is provided on the vehicle, and in that the current collector is connected to a charger for charging the electrical energy store.

12. The transportation device according to claim 11, wherein the charger is connected to an on-board electrical system.

13. The transportation device according to claim 10, wherein the transportation device moves two vehicles that are coupled to one another, whereby on-board electrical systems of the two vehicles are connected to one another by an auxiliary power supply bus.

14. The transportation device according to claim 8, wherein only the generator supplies electrical energy to the electrical loads of the vehicle while said vehicle moves at a speed that is greater than the limit speed.

\* \* \* \* \*